Patented June 9, 1931

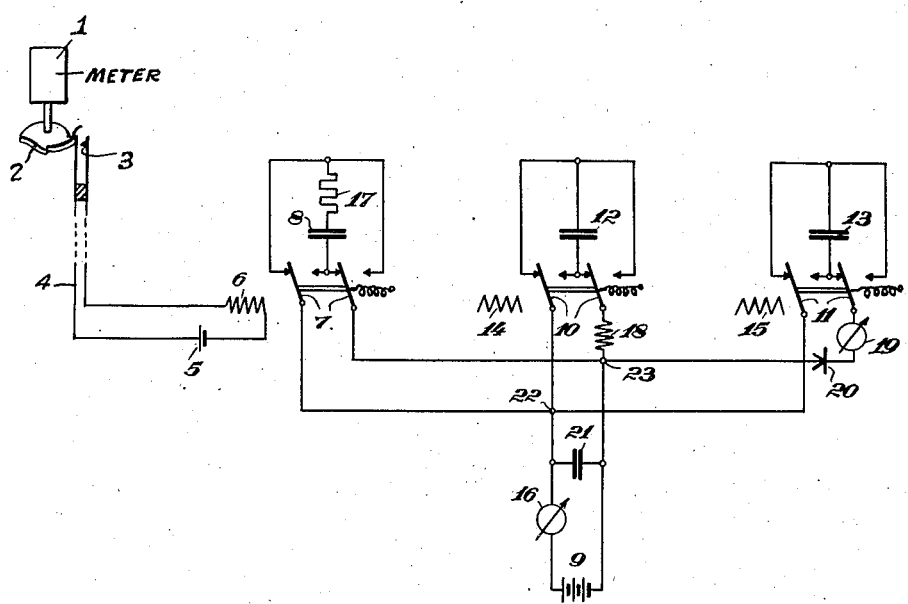

1,809,269

UNITED STATES PATENT OFFICE

WILHELM GAARZ, OF BERLIN-CHARLOTTENBURG, AND JOACHIM DALCHAU, OF BERLIN-TEGEL, GERMANY, ASSIGNORS TO SIEMENS & HALSKE AKTIENGESELLSCHAFT, OF SIEMENSSTADT, NEAR BERLIN, A CORPORATION OF GERMANY

SUMMATION METER

Application filed December 11, 1929, Serial No. 413,393, and in Germany December 19, 1928.

This invention relates to an apparatus to indicate the sum of several quantities.

It is known that in order to be able to measure any quantities or factors over considerable distances, such quantities or factors are allowed to operate on a meter, the speed of rotation of which is therefore a direct function of the quantities or factors to be measured. The meter is provided with a contact device so that it produces a number of contact closings per unit of time which again is dependent simply on the quantities or factors to be measured. The current impulses produced by the contact closings may be carried over any desired distance and cause at the measuring point the charging or discharging of a condenser, the charging or discharging currents of which flow through a measuring instrument. If this is sufficiently sluggish, its deflection corresponds to the quantities or factors to be measured.

This arrangement also permits the sum of several quantities to be ascertained in a simple manner. For this purpose, the condensers are connected in parallel so that their charging or discharging currents all pass through the measuring instrument.

The drawing shows an example of construction. A current which is to be measured, flows through a meter 1. The rotating disc 2 of the meter actuates the contact 3. This is connected through a line 4 of any desired length with a current source 5 and a relay coil 6. With each excitation of this relay coil a double reversing switch 7 is placed in the position shown; on demagnetization it returns into the other position by the action of a spring. The double reversing switch 7 connects the condenser 8 with a source of current 9, alternately in one or the other current direction, so that the condenser, with each movement of the reversing switch, is first discharged and then again charged in the reverse direction. Further condensers 12 and 13 are connected in parallel with the condenser 8 through the reversing switches 10 and 11. The reversing switches 10 and 11 are controlled in the same way as the reversing switch 7 by relay coils 14 and 15, the excitation of which is controlled by other currents to be measured. As the apparatuses used for this purpose have the same appearance as those shown in conjunction with the relay coil 6, a repetition in the drawing is not necessary. All charging or discharging currents of the three condensers 8, 12, 13 flow through the total measuring instrument 16 in the same direction, so that this at all times shows the sum of the three quantities or factors to be measured.

The apparatus, however, does not in all cases work in the manner described without error. The charging current which, for example, flows into the condenser 13, directly after the reversing switch 11 has altered its position, must also flow through the measuring instrument 16, the resistance of which causes a drop in potential. Consequently not only the battery 9 but also the condensers 8 and 12 supply energy into the condenser 13. Although the charges given up by these condensers 8 and 12 to the condenser 13 do not flow through the total measuring instrument 16, an error in measurement will not be produced, as a rule, since upon the equalization of the potential of the condensers with that of the battery 9 the condensers 8 and 12 will again draw the charge delivered to the condenser 13, from the current source, that is, through the measuring instrument. A measuring error, however, does occur when one of the condensers 8 and 12, after it has given up a part of its charge to the condenser 13 and has thus somewhat reduced its potential, is directly switched over by its reversing switch 7 or 10; for now first the part of its charge given up by the condenser is not replaced by the battery and, furthermore, it does not give on the discharge taking place in consequence of the switching over, the quantity of electricity corresponding to the full potential.

In order to overcome this defect, means are provided, according to the invention, to counteract the charging of one of the condensers by the discharge of another. This purpose is served, for example, by a resistance 17 in the separate circuit of the condenser 8. If this resistance is so great that it is at least of the same order as the resistance in the circuit of the current source 9 up to the branch points, then the discharge current of the condenser 8 is subject to a fall of potential which counteracts the giving up of its charge to another condenser. If the resistance 17 is considerably larger than the resistance in the current circuit of the battery 9, then the charging of another condenser by the condenser 8 can under all circumstances be so much reduced that appreciable measuring errors are no longer caused thereby.

The resistance may also be an inductive resistance 18. It may also be situated between the branch point and the reversing switch as this is, for example, shown for the condenser 12. It is often desirable to be able to measure the separate values at the point of observation. For this purpose, separate measuring instruments may be arranged between the branch points and the reversing switches, as for example the measuring instrument 19 on the condenser 13. The measuring instrument then acts at the same time as resistance for the purpose of our invention. In order to still further increase the resistance, an inductive resistance may also be provided between the reversing switch 11 and the condenser 13.

The resistances also, of course, increase the time taken up by the discharge and recharging of each separate condenser on the working of its change-over switch. Instead of being a disadvantage this has the advantage that the charging and discharging currents take place less by impulses, so that even a smaller number of contact closings of the contact 3 give a sufficiently steady indicator position of the total measuring instrument 16.

The invention can, however, also be carried out by arranging an auxiliary condenser 21 in parallel to the current source 9 and quite close to the branch points 22 and 23 from which the lines lead to the individual condensers, the capacity of this auxiliary condenser being large as compared with the capacity of the condensers 8, 12 and 13; in order to be certain of good results, its capacity is even made large with respect to the sum of all the separate capacities. Between the auxiliary condenser and any condenser to be at once discharged and again recharged, there are then no resistances which a current coming from another condenser would not also have to overcome. Consequently the auxiliary condenser 21 sufficiently maintains the full battery potential on the branch points so that individual condensers, which are not reversed, cannot deliver any appreciable charge.

In the drawing the different possibilities of carrying out the invention, viz:—ohmic or inductive resistances, or an auxiliary condenser, are shown simultaneously. These means may also be used simultaneously but with correct dimensioning they will separately suffice for the avoidance of inadmissible measuring errors.

A further feature of our invention consists in interposing rectifiers between the branch points 22 and 23 on the one hand, and the change-over switches 7, 10 and 11 on the other hand, which rectifiers only allow a current to pass from the branch points to the separate condensers, but not from the condensers to the branch points. A rectifier 20 of this type is represented in the branch line leading to the switch 11. Tube rectifiers may be used as the rectifiers. Dry rectifiers, as for example copper oxide rectifiers, or copper sulphur rectifiers, are particularly suitable. If even with these a small return current is possible, the rectifier presents so great a resistance to this return current, that the outer small return charge quantities cannot unduly affect the measuring result.

In the particular embodiment illustrated, both the charging and the discharge currents of the condensers flow through the total measuring instrument 16. The invention is, however, practicable when only the charging or only the discharge currents are carried through the measuring instrument.

We claim:

1. In a device for indicating the sum of several quantities, a source of current, several condensers, several switching devices which permit a temporary connection of the condensers with the source of current, a measuring instrument connected in a common part of the lines connecting the source of current with the switching devices and a rectifier in the individual line connecting the source of current with one of the condensers.

2. In a device for indicating the sum of several quantities, a source of current, several condensers, several switching devices which permit a temporary connection of the condensers with the source of current, a measuring instrument connected in a common part of the lines connecting the source of current with the switching devices and a condenser connected at the branch points of the lines connecting the source of current with the condensers and having a capacity which is high as compared with the capacities of the above-named condensers.

3. In a device for indicating the sum of several quantities, a source of current, several condensers, several switching devices, which permit the temporary connection of the condensers with the source of current, a measuring instrument connected in a common part of the lines connecting the source of current with the switching devices, resistances in the individual lines connecting the source of current with the condensers and a condenser connected at the branch points of the lines connecting the source of current with the condensers and having a capacity which is high as compared with the capacities of the above-named condensers.

4. In a device for indicating the sum of several quantities, a source of current, several condensers, several switching devices, which permit a temporary connection of the condensers with the source of current, a measuring instrument in a common part of the lines connecting the source of current with the switching devices, a rectifier in the individual line connecting the source of current with one of said condensers and a condenser connected at the branch points of the lines connecting the source of current with the condensers and having a capacity which is high as compared with the capacities of the above-named condensers.

5. In a device for indicating the sum of a plurality of quantities, a source of current, a plurality of condensers, a conductor leading from said source and provided with a plurality of lines branched off therefrom, a plurality of switches connecting the individual lines with the respective condensers and so arranged that upon actuation of any one of such switches the connections of the respective condenser will be reversed in polarity, a measuring instrument interposed in said conductor between the branching-off point and the source of current, and means for substantially preventing the discharge of one condenser from being effected by the reversal in the polarity of another condenser.

6. A device according to claim 5, in which lines leading from the branching-off point to individual condensers include resistances of such magnitude as to prevent substantially the discharge of one condenser from being effected by the reversal in the polarity of another condenser.

7. A device according to claim 5, in which the means mentioned at the end of said claim embodies a rectifier included in a line leading from the branching-off point to a condenser.

8. A device according to claim 5, in which the means mentioned at the end of said claim embodies a resistance included in a line leading from the branching-off point to a condenser.

9. A device according to claim 5, in which the means mentioned at the end of said claim embodies a condenser connected in parallel with the source of current and a capacity which is large relatively to the capacities of the other condensers.

10. A device according to claim 5, in which the mean mentioned at the end of said claim embodies a condenser connected in parallel with the source of current and a capacity which is large relatively to the capacities of the other condensers, and also embodies a rectifier included in a line leading from the branching-off point to a condenser.

In testimony whereof we affix our signatures.

WILHELM GAARZ.
JOACHIM DALCHAU.